VAN R. W. HORTON.
Gate.
No. 78,095.
2 Sheets—Sheet 1.
Patented May 19, 1868.
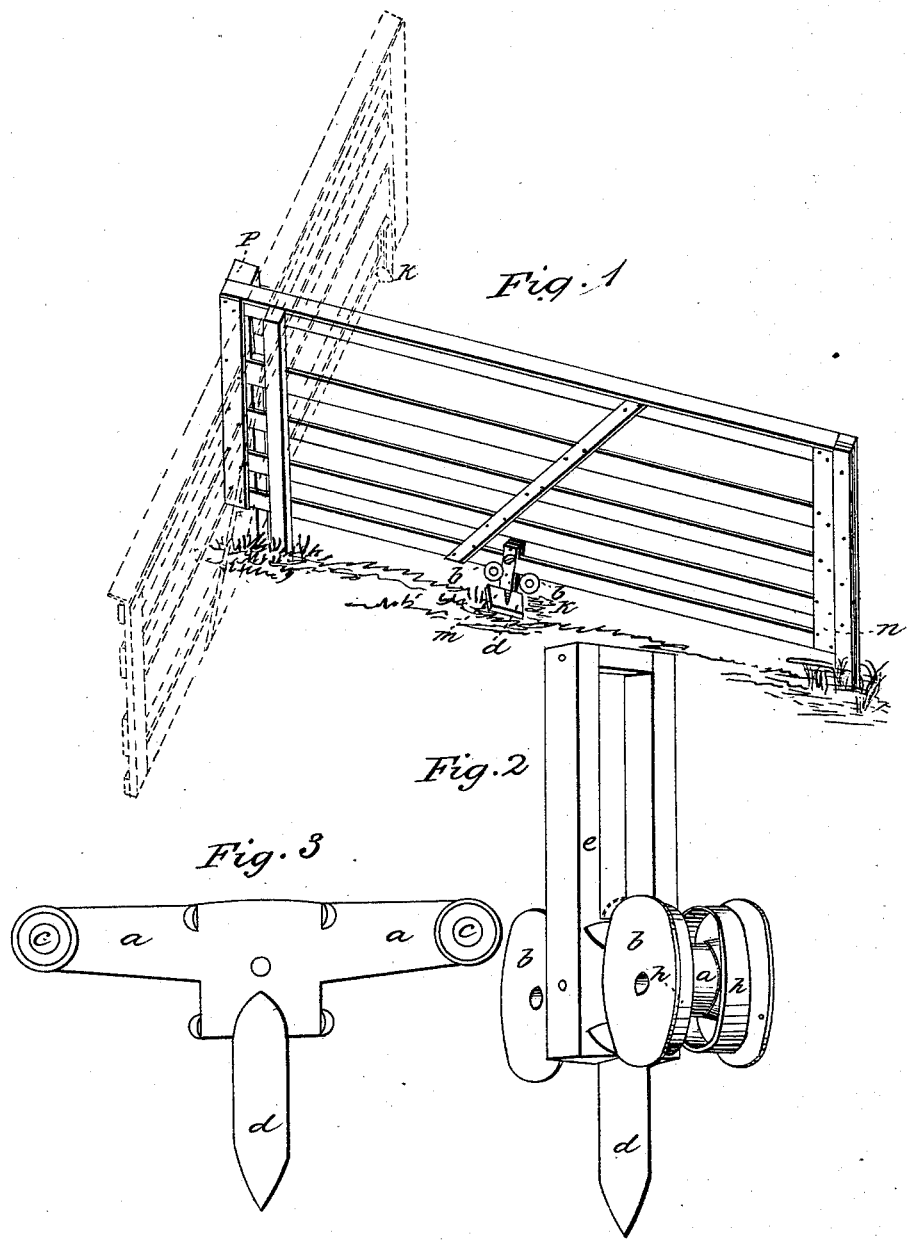
Witnesses:
P. D. Horton
Murjanzy Hopkins
Inventor:
Van Rensselaer W. Horton VAN R. W. HORTON.  
Gate.
No. 78,095.
2 Sheets—Sheet 2.
Patented May 19, 1868.
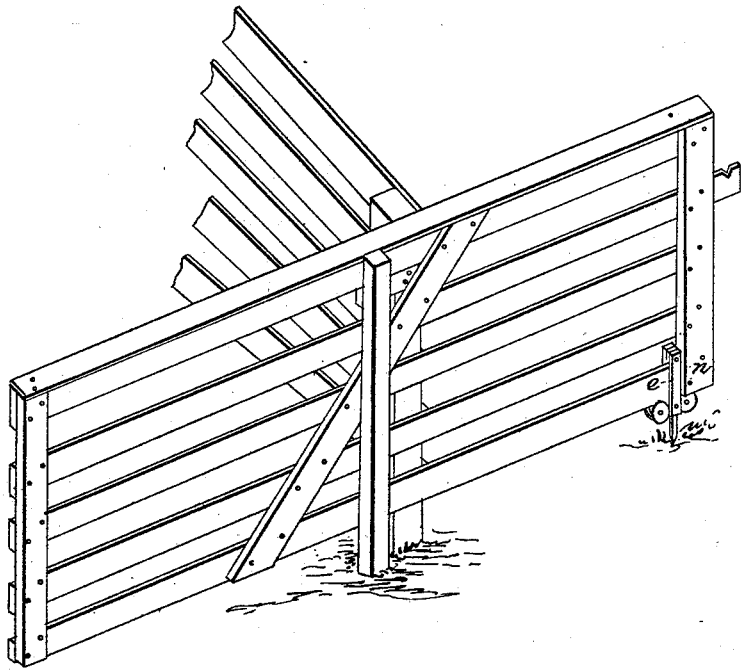
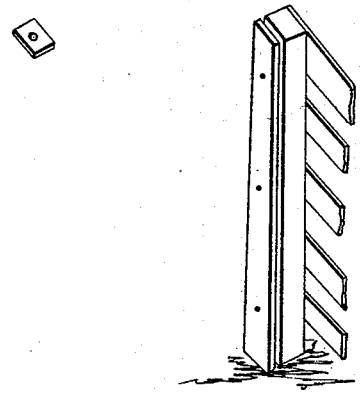
Witnesses:
P. D. Horton
A. H. Vanderbilt
Inventor:
Van Rensselaer W. Horton

United States Patent Office.

VAN RENSSELAER W. HORTON, OF PALMYRA, NEW YORK.

Letters Patent No. 78,095, dated May 19, 1868.

IMPROVEMENT IN FARM-GATES.

The Schedule referred to in these Letters Patent and making part of the same.

TO ALL WHOM IT MAY CONCERN:

Be it known that I, VAN RENSSELAER W. HORTON, of the town of Palmyra, in the county of Wayne, and State of New York, have invented a new and useful Improvement in Farm-Gates; and I do hereby declare that the following is a full, clear, and exact description of the construction and operation of the same, reference being had to the annexed drawings, making a part of this specification, in which—

Figure 1 is a view of a movable support, K, in combination with a sliding and swinging gate, showing its different positions, as the gate is open or shut.

Figure 2 is a view of the same support detached from the gate.

Figure 3 represents the body of this support, consisting of a standard, $d$, and arms, $a\ a$, with holes $c\ c$ to receive the axles of two rollers $b\ b$, shown at fig. 2, attached to the body.

These rollers have rims $h\ h$, and flanges $o\ o$, and are made by joining two small wheels on opposite sides of the arms $a\ a$ with an axle which revolves in the arm and is fixed in the wheels. Between the rollers $b\ b$ is placed a loop, $e$, that receives the bottom rail of the gate, which rests on the rims of the rollers $b\ b$, when the gate is shut, the foot of the standard $d$ being at the same time on a stone, $m$, or other hard foundation, at or near the middle of the gateway.

In being opened the gate has its fore part supported on the wheels $b\ b$, and runs backward upon them till the cleat $n$ meets the loop $e$, when it balances on a pin or other fixed support at the post P, and lifting the movable support, in being swung to one side, carries it out of the passage. When the gate is swung back, it returns the support K to its first position to carry the gate again in being shut.

The form of the movable support may be modified in several ways, without any change in the manner of combining it with the gate, or of accomplishing the purpose which it serves; as, to make the body with two legs or standards instead of one, and use one roller placed in the middle, instead of two placed at the ends of the arms $a\ a$. Therefore, I do not limit my claim to the use of a movable support with two wheels or rollers, or with a single standard.

I do not claim the construction of the gate to which my movable support is applied; nor the balancing and swinging of it on a pin or its equivalent at the post P; nor do I claim any form of support that is either set in the ground, as a post and wheel, or is fixed immovable to any point on the gate as a caster; but—

I claim the combination, with a sliding and swinging gate, of a movable support, provided with a roller or rollers, and loosely attached to the bottom rail of the gate, by a loop or its equivalent, the whole so combined and operating, substantially as herein shown and described, that the gate, when closed, rests centrally upon the support, and has a free sliding movement through or upon it in being opened and shut, and lifts it and carries it out of the passage when swung to one side.

I also claim the movable support K, consisting of the body represented by fig. 3, the rollers $b\ b$, and the loop $e$, shown in combination with body at fig. 2, the whole combined and operating substantially as herein shown and described.

VAN RENSSELAER W. HORTON.

Witnesses:
P. D. HORTON,
M. HOPKINS.